(12) United States Patent  
Carnall et al.

(10) Patent No.: US 9,819,033 B2  
(45) Date of Patent: Nov. 14, 2017

(54) MODULAR FUEL CELL AND FUEL SOURCE (71) Applicant: INTELLIGENT ENERGY LIMITED, Loughborough (GB)

(72) Inventors: Andrew John Carnall, Loughborough (GB); Simon Nicholas, Loughborough (GB); Ashley James Kells, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 24 days.

(21) Appl. No.: 14/784,905

(22) PCT Filed: Apr. 15, 2014

(86) PCT No.: PCT/GB2014/051172  
§ 371 (c)(1),  
(2) Date: Oct. 15, 2015

(87) PCT Pub. No.: WO2014/170657  
PCT Pub. Date: Oct. 23, 2014

(65) Prior Publication Data  
US 2016/0149235 A1 May 26, 2016

(30) Foreign Application Priority Data  
Apr. 16, 2013 (GB) .................................. 1306890.3

(51) Int. Cl.  
*H01M 8/04* (2016.01)  
*H01M 8/04082* (2016.01)  
(Continued)

(52) U.S. Cl.  
CPC ... *H01M 8/04201* (2013.01); *H01M 8/04104* (2013.01); *H01M 8/0625* (2013.01); *H01M 2250/30* (2013.01); *Y02B 90/18* (2013.01)

(58) Field of Classification Search  
CPC ......... H01M 8/04201; H01M 8/04104; H01M 2250/30; H01M 8/0625; Y02B 90/18  
See application file for complete search history.

(56) References Cited

U.S. PATENT DOCUMENTS

2004/0265656 A1* 12/2004 Hashizume .......... B01J 19/0093  
48/118.5  
2005/0008932 A1* 1/2005 Plotkin ............. H01M 8/04186  
429/118

(Continued)

FOREIGN PATENT DOCUMENTS

EP 1375419 A2 1/2004  
EP 2534722 B1 7/2015  
(Continued)

OTHER PUBLICATIONS

Great Britain Patent Application No. 1306890.3; Search Report; dated Oct. 15, 2013; 4 pages.  
(Continued)

Primary Examiner — Stewart Fraser  
(74) Attorney, Agent, or Firm — Baker Hostetler LLP (57) ABSTRACT A fuel cell power module is coupled to a fuel supply reactor module by way of an adaptor which includes some of the control elements for controlling reaction of reactants in the reactor module. The adaptor includes a housing and a first connection interface in the housing for detachably coupling the adaptor to a fuel cell power module fuel inlet port and a second connection interface in the housing for detachably coupling the adaptor to a reactor module fuel outlet port. A fluid line extends between the first connection interface and the second connection interface. The adaptor includes a motive unit of a flow control mechanism configured to provide motive power to a flow circuit of a reactor module when the reactor module is coupled to the adaptor. The adaptor enables a fuel cell power module to be interfaced (Continued)

with different types of reactor modules having different form factor and different control requirements.

33 Claims, 9 Drawing Sheets

(51) Int. Cl.
*H01M 8/04089* (2016.01)
*H01M 8/0612* (2016.01)

(56) References Cited

U.S. PATENT DOCUMENTS

| | | | |
|---|---|---|---|
| 2005/0058877 A1 | 3/2005 | Fujita et al. | |
| 2006/0260715 A1* | 11/2006 | Muller | H01M 8/04201 141/355 |
| 2008/0311440 A1* | 12/2008 | Joung | H01M 8/04201 429/418 |
| 2010/0090642 A1* | 4/2010 | Brantley | H01M 2/1022 320/101 |
| 2010/0247426 A1 | 9/2010 | Wallace et al. | |

FOREIGN PATENT DOCUMENTS

| | | |
|---|---|---|
| JP | 2009-230902 A | 10/2009 |
| WO | WO 2011/097198 A1 | 8/2011 |

OTHER PUBLICATIONS

International Search Report and Written Opinion dated Jul. 2, 2014 in International Application No. PCT/GB2014/051172.

* cited by examiner

MODULAR FUEL CELL AND FUEL SOURCE

CROSS-REFERENCE TO RELATED APPLICATIONS

This application is a National Stage of International Patent Application No. PCT/GB2014/051172, filed Apr. 15, 2014 and claims priority to foreign application GB 1306890.3, filed Apr. 16, 2013, the contents of which are incorporated herein by reference in their entirety.

The present invention relates to electrochemical fuel cells and in particular, though not exclusively, to electrochemical fuel cells configured for use as portable electrical power sources with replaceable, plug-in type fuel reservoirs.

Many people now routinely carry a number of portable electronic devices, such as a mobile telephone, a personal music player, a portable computer, a personal gaming device and the like. These devices routinely require connection to a mains power supply for extended operation of the device or for recharging the device. Recent developments in electrochemical fuel cell technology have enabled the development of compact fuel cells as a source of electrical power for such portable electronic devices. These fuel cell power sources may be integrated into the portable electronic device or may be provided as separate power adapters or charger units.

The fuel cell power sources require a supply of fuel, commonly hydrogen. For fully portable, fuel cell-based electrical power sources, it is desirable to have a compact, safe and controllable source of hydrogen. One way of providing the hydrogen fuel is by way of reactor modules which generate hydrogen gas as and when required by the reaction of a reactant material and an aqueous solution or water. This provides an alternative to methods of storing hydrogen, such as the use of canisters of pressurised hydrogen.

A known type of reactor releases hydrogen on demand by the reaction of reactant fuel material, such as a stabilized alkali metal material, contained within a reaction chamber, with an aqueous solution or water supplied from a water chamber. As water is fed into the reaction chamber, hydrogen gas is generated and gas pressure is created in the reaction chamber which stops further input of water, until the hydrogen pressure falls, for example by drawing off the hydrogen from the reaction chamber for consumption by a fuel cell. Another known type of reactor releases hydrogen on demand by the reaction of reactant fuel material supplied from a chemical solution reservoir when it is delivered into a reaction chamber containing a catalyst. Examples of hydrogen-generating apparatus are found in WO 2011/097198 and EP 1375419.

A feature of some reactor modules is the requirement to provide motive power to drive fluid into the reaction chamber to thereby initiate the reaction which generates the hydrogen fuel. This motive power may be provided by way of a pump mechanism and may be controlled by suitable valves and a control system. These items are generally referred to herein as a flow control mechanism. In one example, a flow control mechanism may comprise a mechanically spring-loaded chamber urging fluid from a fluid reservoir into the reaction chamber in combination with a control valve to regulate the flow. In another example, an electrically actuated pump may be used to urge fluid from the fluid reservoir into the reaction chamber, as required.

It is convenient if the fuel supply reactor module is provided as a replaceable module (either disposable or refillable) for plugging into the fuel cell power source when required.

As a general principle, the flow control mechanism can be incorporated into the reactor module. This represents a considerable cost and size overhead on the reactor module which is preferably a disposable or refillable item. Alternatively, the flow control mechanism can be incorporated into the fuel cell power source and can be used to act on a reactor module when plugged into the fuel cell power source. This has the benefit of not requiring replacement of flow control mechanism components with the disposable or refillable reactor module, but requires a specialised, custom-designed interface between fuel cell and reactor module which limits the flexibility for a fuel cell power source to use different reactor modules.

It would be desirable to have a simple, low cost and easily implemented system for interfacing a hydrogen gas supply reactor module with a fuel cell power source.

According to one aspect, the present invention provides an adaptor for a fuel cell power source comprising:
a housing;
a first connection interface in the housing for detachably coupling the adaptor to a fuel cell power module fuel inlet port;
a second connection interface in the housing for detachably coupling the adaptor to a reactor module fuel outlet port;
a fluid line extending between the first connection interface and the second connection interface;
a motive unit of a flow control mechanism configured to provide motive power to a flow circuit of a reactor module when the reactor module is coupled to the adaptor.

The motive unit may comprise a motor and pump, and the second connection interface may comprise a first reactant port and a second reactant port, the pump being disposed in a fluid line extending between the first reactant port and the second reactant port. The motive unit may comprise a pump motor having a drive output disposed on the second connection interface for coupling to a pump head in the reactor module. The motor and pump may comprise a peristaltic pump. The drive output may comprise a roller configured to cooperate with a peristaltic pump head in a reactor module when the reactor module is coupled to the second connection interface. The first connection interface may include an electrical connection interface for receiving control signals and/or electrical power from a fuel cell power module. The adaptor may include an electronic controller coupled to the electrical connection interface for receiving control signals from the fuel cell power module. The first connection interface may include a mechanical actuator coupled to a valve, the mechanical actuator being operable by a fuel cell power module when coupled to the first connection interface. The first connection interface may include a mechanical actuator coupled to a valve, the mechanical actuator being operable by a fuel cell power module when coupled to the first connection interface. The second connection interface may comprise a mechanical actuator for operating a closure valve or seal of the reactor module. The adaptor may include a controller configured to control the motive unit. The motive unit may comprise a flow control valve, and the second connection interface may comprise a first reactant port and a second reactant port, the switching valve being disposed in a fluid line extending between the first reactant port and the second reactant port.

In another aspect, the invention provides a modular reactor assembly comprising an adaptor as described above and a reactor module, the reactor module having connection interface configured to engage and cooperate with the second connection interface of the adaptor.

The reactor module may comprise:
a reactant reservoir containing a first reactant,
a reaction chamber containing a second reactant;
a flow circuit comprising a flow path extending between the reactant reservoir and the reaction chamber; and
a flow control element in the flow path for controlling flow of first reactant to the reaction chamber, the flow control element being driveable by the motive unit of the adaptor when the reactor module is coupled to the second connection interface of the adaptor.

The reactor module may comprise:
a reactant reservoir containing a first reactant,
a reaction chamber containing a second reactant; and
a flow circuit comprising a first flow path extending from the reactant reservoir to the reactor module connection interface and a second flow path extending from the reactor module connection interface to the reaction chamber; and the adaptor may comprise:
a first reactant port and a second reactant port in the second communication interface respectively engaging with the first flow path and the second flow path of the reactor connection interface,
wherein the motive unit comprises a flow control element in a fluid line extending between the first reactant port and the second reactant port for controlling flow of first reactant to the reaction chamber via the fluid line of the adaptor when the reactor module is coupled to the second connection interface of the adaptor.

The adaptor may define a cavity into which the reactor module is received. The cavity may be closable when the reactor module is received into the cavity. The reactor module may define a cavity into which the adaptor module is received.

According to another aspect, the invention provides a fuel cell power source comprising:
a housing;
a connection interface in the housing for detachably coupling the fuel cell power source to a reactor module fuel outlet port;
a motive unit of a flow control mechanism configured to provide motive power to a flow circuit of a reactor module when the reactor module is coupled to the fuel cell power source.

The motive unit may comprise a motor and pump, and the connection interface may comprise a first reactant port and a second reactant port, the pump being disposed in a fluid line extending between the first reactant port and the second reactant port. The motive unit may comprise a pump motor having a drive output disposed on the connection interface for coupling to a pump head in the reactor module. The motor and pump may comprise a peristaltic pump. The drive output may comprise a roller configured to cooperate with a peristaltic pump head in a reactor module when the reactor module is coupled to the connection interface. The connection interface may comprise a mechanical actuator for operating a closure valve or seal of the reactor module.

The motive unit may comprise a flow control valve, and the second connection interface may comprise a first reactant port and a second reactant port, the switching valve being disposed in a fluid line extending between the first reactant port and the second reactant port. The fuel cell power source may include a cavity in the housing into which a reactor module is receivable.

The present invention further provides a method of operating a fuel cell power source comprising:
a) providing an adaptor having:
a housing;
a first connection interface in the housing for detachably coupling the adaptor to a fuel cell power module fuel inlet port;
a second connection interface in the housing for detachably coupling the adaptor to a reactor module fuel outlet port;
a fluid line extending between the first connection interface and the second connection interface;
a motive unit of a flow control mechanism configured to provide motive power to a flow circuit of a reactor module when the reactor module is coupled to the adaptor;
b) coupling the first connection interface to a fuel cell power module;
c) connecting the second connection interface to a reactor module; and
d) controlling delivery of fuel from the reactor module to the fuel cell power module via the adaptor.

The method may further include the step of controlling delivery of fuel by an electronic controller in the adaptor.

According to another aspect, the invention provides a method of operating a fuel cell power source comprising:
a) providing a fuel cell power source having:
a housing;
a connection interface in the housing for detachably coupling the fuel cell power source to a reactor module fuel outlet port;
a motive unit of a flow control mechanism configured to provide motive power to a flow circuit of a reactor module when the reactor module is coupled to the fuel cell power source;
b) coupling the connection interface to a reactor module; and
c) controlling delivery of fuel from the reactor module to the fuel cell power module using the motive unit in the fuel cell power source.

According to another aspect, the invention provides a computer program comprising computer program code configured for loading onto an adaptor for a fuel cell power source to configure the adaptor to control delivery of fuel from a reactor module to a fuel cell power source, using a motive unit within the adaptor.

According to another aspect, the present invention provides a computer program comprising computer program code configured for loading onto a fuel cell power source to configure the fuel cell power source to control delivery of fuel from a reactor module to the fuel cell power source using a motive unit within the fuel cell power source.

According to another aspect, the present invention provides a computer program comprising computer program code configured to perform the methods as defined above.

Embodiments of the present invention will now be described by way of example and with reference to the accompanying drawings in which.

It has been recognised by the inventors that for increased flexibility in both fuel cell power source and reactor module design, as well as for increased flexibility for end users of fuel cell power sources, it is highly desirable that a fuel cell power source is not limited to interoperability with a single reactor module design. This means that an end-user or purchaser of the fuel cell power source is not limited to, for example, reactor modules from one manufacturer or supplier. It is also highly desirable that a reactor module carries only the minimum number of components necessary so that longer-lasting components of the system are not replaced each time a reactor module is used to avoid wastage and to reduce the cost of the disposable item. It may also be important that a fuel cell power source is able to adequately control the operation of the reactor module.

Accordingly, the present invention proposes the provision of an interface module which separates, from both the reactor module and the fuel cell power source module, key elements of a flow control mechanism that provides flow control from a reactant reservoir to a reaction chamber of the reactor module.

Figure 1:
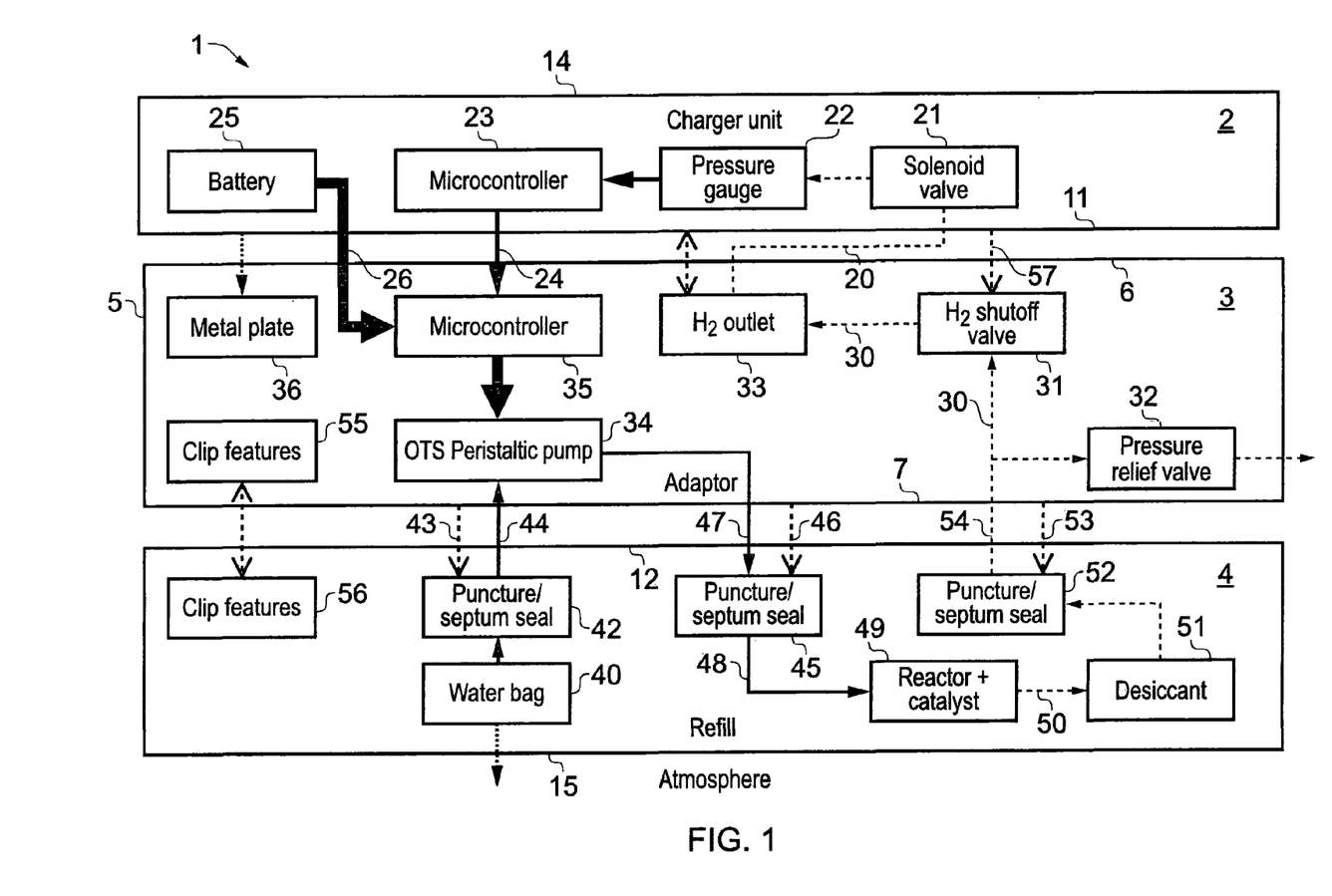
FIG. 1 is a schematic diagram of a modular fuel cell power source, adaptor and reactor assembly deploying a peristaltic pump in the adaptor.

With reference to FIG. 1 a modular arrangement of a fuel cell power supply 1 comprises a fuel cell power module 2, an adaptor module 3 and a reactor module 4. The adaptor module 3 (also referred to herein as "adaptor") has an independent housing 5 including or defining two separate connection interfaces 6, 7. The first connection interface 6 is configured for coupling to a corresponding interface 11 on the fuel cell power module housing 14 and the second connection interface 7 is configured for coupling to a corresponding interface 12 on the reactor module housing 15.

The interfaces 6, 7, 11, 12 form part of the respective separate housings 5, 14, 15 of the adaptor module 3, the fuel cell power module 2 and the reactor module 4. The interfaces 6, 7, 11, 12 include mechanical structures for detachable engagement of the respective modules to one another. These mechanical structures include mating faces for mechanical contact between the interfaces and suitable retention mechanisms. The retention mechanisms may be of any suitable type such as those using clips, locks, threaded collars, friction fit surfaces, magnetic couplings and the like, and any combination thereof. The mating faces may include plug and socket arrangements or keyed surfaces for ensuring correct alignment and correct engagement. The interfaces 6, 7, 11, 12 also include a number of different communication structures which allow for mechanical, electrical and fluid communication (a) between the fuel cell power module 2 and the adaptor module 3, and (b) between the adaptor module 3 and the reactor module 4. These will be described in more detail below.

Each of the fuel cell power module 2, the adaptor module 3 and the reactor module 4 is an independent unitary structure with its own separate housing.

The fuel cell power module 2 includes an electrochemical fuel cell stack (not shown) for generating electrical power from a suitable fuel source, according to well known principles. The fuel cell power module 2 is preferably what may be described as a micro fuel cell, e.g. of pocket sized dimensions for ultra-portability and of a capacity suitable for powering consumer devices such as those mentioned above. The fuel source is preferably hydrogen although other fuels can be used, such as hydrocarbons.

The fuel is received into the fuel cell power module 2 via an inlet port 20 to a solenoid valve 21 and a pressure gauge 22 and from there to the fuel cell stack (not shown). A microcontroller 23 may provide control functions for the fuel cell stack and for the adaptor 5. An electrical control interface 24 provides for communication with the adaptor 3. A battery 25 may provide power to the fuel cell power module 2 and may also provide power to the adaptor 3 by a power interface 26.

The adaptor module 3 includes a fluid fuel line 30 extending between the first connection interface 6 and the second connection interface 7. The fluid fuel line 30 may incorporate a shut-off valve 31, a pressure relief valve 32 and a hydrogen outlet 33 at the first connection interface 6. The fluid fuel line 30 is operable to transfer hydrogen fuel from the reactor module 4 to the fuel cell power module 2. The pressure relief valve 32 may be provided to vent to atmosphere in the event of an overpressure condition. In alternative arrangements, a pressure relief valve could be located in the reactor module 4 instead, or as well as in the adaptor module.

The adaptor module 3 further includes a pump 34, which in this arrangement is a peristaltic pump. A microcontroller 35 provides control functionality to this pump 34. The microcontroller 35 may be at least partially controlled by the microcontroller 23 in the fuel cell power module, using the electrical control interface 24.

The interface 6, 11 between the fuel cell power module 2 and the adaptor module 3 may also include a sensing mechanism for detecting presence of the adaptor module and a retention mechanism for retaining the adaptor module. The sensing mechanism and/or the retention mechanism could be embodied in a magnetic sensing and retention mechanism comprising a metal plate 36 in the adaptor module and a suitable magnet and sensor (not shown in FIG. 1 but represented in other figures by way of example) in the fuel cell power module 2.

In the arrangement of FIG. 1, the reactor module 4 comprises a fluid reservoir 40 which can be a flexible fluid reservoir such as a water bag or bladder. The reactor module 4 has a conduit 41 leading from the fluid reservoir 40 to a first seal 42 at the interface 12. The first seal 42 may be a puncture seal or septum seal which can be opened by a mechanical component in the adaptor module indicated schematically by the mechanical interface 43. The first seal 42 thereby forms part of a first fluid coupling or interface 44 to the inlet of the pump 34 of the adaptor module 3.

The reactor module 4 further includes a second seal 45 at the interface 12. The second seal 45 may be a puncture seal or septum seal which can be opened by a mechanical component in the adaptor module 3 indicated schematically by the mechanical interface 46. The second seal 45 thereby forms part of a second fluid coupling or interface 47 to the outlet of the pump 34 of the adaptor module 3.

A fluid conduit 48 leads from the second seal 45 to a reaction chamber 49 housing a reactant and/or a catalyst if required. A fluid conduit 50 leads from the reaction chamber 49 to a desiccant chamber 51 and then to a third seal 52. The third seal 52 may be a puncture seal or septum seal which can be opened by a mechanical component in the adaptor module indicated schematically by the mechanical interface 53. The third seal 52 thereby forms part of a third fluid coupling or interface 54 to the fluid fuel line 30 of the adaptor module 3. The reactor module 4 may also include a pressure relief valve (not shown) between the reaction chamber 49 and the third seal 52.

Both the adaptor module 3 and the reactor module 4 include a retention mechanism for releasably maintaining the two modules in locking engagement with one another. The retention mechanism could be embodied in a mechanical clip arrangement indicated schematically as clip features 55 and 56.

In use, a reactor module 4 is attached to the adaptor 3 by way of the interface 7, 12 using the retention mechanism 55, 56 to lock the two component parts together. The action of joining the two modules 3, 4 at the interface 7, 12 opens the seals 42, 45, 52 by the mechanical interfaces 43, 46, 53 thereby creating fluid communication paths: (i) from the fluid reservoir 40 to the pump 34; (ii) from the pump 34 to the reaction chamber 49; and (iii) from the reaction chamber 49 to the fuel line 30.

As the adaptor 3 is commanded by microcontroller 35 to operate the pump 34, reactant (in one example, water) is pumped from the fluid reservoir 40 to the reaction chamber 49. Hydrogen is thereby produced and this is passed through the desiccant chamber 51 to remove moisture and then into the fuel line 30.

When the reactor module 4 and the adaptor module 3 are then coupled to the fuel cell power module 2, the fuel shut-off valve 31 can be operated by an actuator indicated schematically by mechanical interface 57 such that hydrogen fuel can be passed across the interface 6, 11 to the solenoid valve 21 in the fuel cell power module 2. Hydrogen pressure will build up as the reaction in reaction chamber 49 proceeds, which is monitored by the microcontroller 23 using the pressure gauge 22. Hydrogen pressure can be controlled by the microcontroller 23 in concert with microcontroller 35 controlling the flow rate of reactant from the reservoir 40 through the pump 34, taking into account hydrogen fuel usage of the fuel cell stack in the fuel cell power module 2.

In a general aspect, the connection interface 6 in the adaptor 3 exemplifies a first connection interface for detachably coupling the adaptor 3 to a fuel cell power source module fuel inlet port 20. The connection interface 7 in the adaptor 3 exemplifies a second connection interface for detachably coupling the adaptor to a reactor module 4 fuel outlet port 54. The peristaltic pump 34 in the adaptor module 3 exemplifies a motive unit of a flow control mechanism which is configured to provide motive power to a flow circuit of a reactor module 4 when the reactor module 4 is coupled to the adaptor 3. The fluid couplings 44, 47 exemplify a first reactant port and a second reactant port in the adaptor module, and the pump 34 lies in a fluid line extending between the first and second reactant ports.

Figure 2:
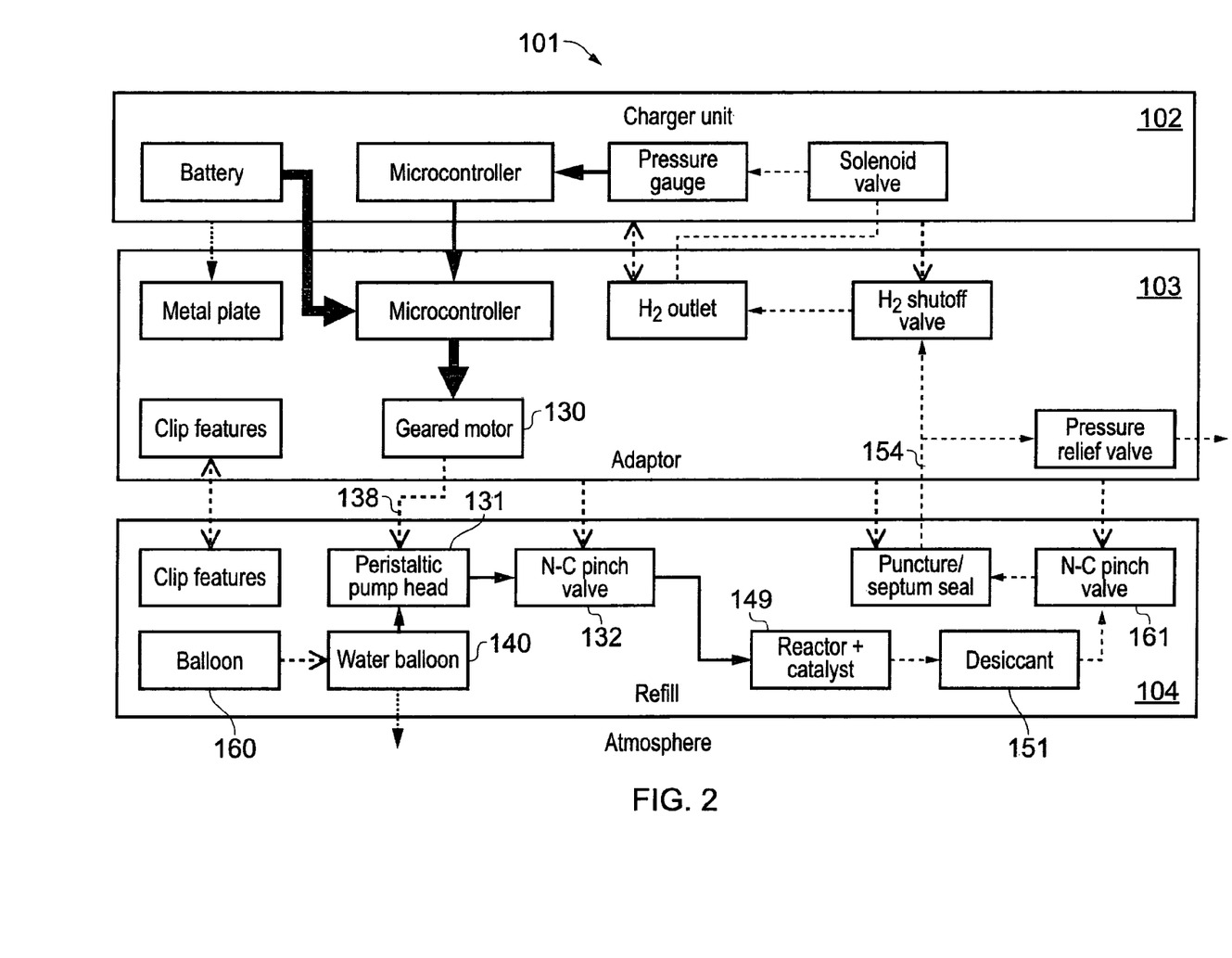
FIG. 2 is a schematic diagram of a modular fuel cell power source, adaptor and reactor assembly deploying a motor drive unit in the adaptor and a peristaltic pump head in the reactor module.

FIG. 2 shows another modular arrangement of a fuel cell power supply 101 comprising a fuel cell power module 102, an adaptor module 103 and a reactor module 104. Most features of this arrangement are the same or similar to corresponding features of the fuel cell power supply of FIG. 1 and need not be described in detail further. However, the arrangement 101 differs from the arrangement 1 in several respects which are discussed below.

In the arrangement of FIG. 2, it is recognised that a part of the peristaltic pump 34 can be relocated into the reactor module 104. A geared motor part 130 of the peristaltic pump 34 is provided in the adaptor module 103 and a pump head part 131 is provided in the reactor module 104. A normally-closed pinch valve 132 is disposed downstream of the peristaltic pump head 131. For example, the motor part 130 may comprise a motor and lobed rotor part of the pump, while the pump head 131 may comprise a flexible compressible tube which is cyclically squeezed by the lobed rotor, in a manner consistent with conventional peristaltic pump operation. More generally, the lobed rotor may be any suitable roller. In this arrangement, only the low cost flexible compressible tube need form part of the (potentially) disposable reactor module 4. In an alternative arrangement, the lobed rotor may be provided in the reactor module 4 and the motor drive provided in the adaptor module. The motor part 130 and the pump head part are coupled in use by a drive shaft schematically indicated at 138.

In use, the operation of the motor 130 serves to cyclically compress the peristaltic pump head tube 131 to compress fluid through the normally-closed pinch valve 132, thereby pumping reactant fluid from the fluid reservoir 140 to the reaction chamber 149.

The arrangement of FIG. 2 also shows an optional additional component in the form of a pressure bias to the reactant fluid chamber 140. In this example, the pressure bias can be in the form of a pressure balloon 160 which serves to maintain pressure on the fluid reservoir 140 which is a flexible balloon. In this way, operation of the peristaltic pump parts 130, 131 is assisted. In particular, if a flat tube is utilised for the compressible tube portion of the peristaltic pump and the pipe leading to it, the pressure balloon 160 expands the flat tube in order to ensure continuous supply to the pump head. A further normally-closed pinch valve 161 may be provided downstream of the desiccant chamber 151 if desired.

In a general aspect, the geared motor part 130 (and possibly also the lobed rotor part) exemplify a motive unit of a flow control mechanism configured to provide motive power to a flow circuit of a reactor module 104 when the reactor module is coupled to the adaptor module 103.

Figure 3:
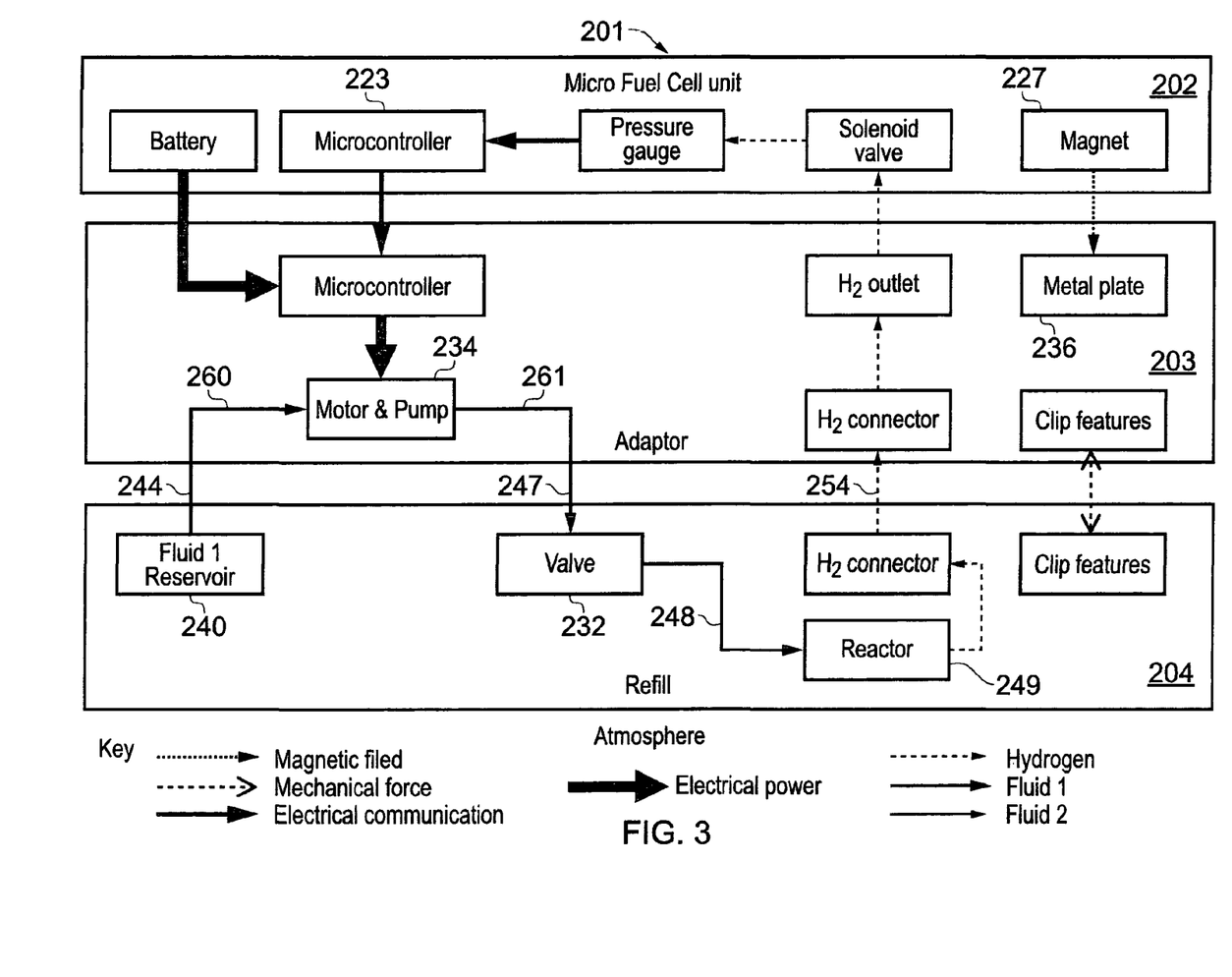
FIG. 3 is a schematic diagram of a modular fuel cell power source, adaptor and reactor assembly deploying a pump unit in the adaptor.

FIG. 3 shows another modular arrangement of a fuel cell power supply 201 comprising a fuel cell power module 202, an adaptor module 203 and a reactor module 204. Most features of this arrangement are the same or similar to the features of the fuel cell power supplies of FIG. 1 or 2 and will not be described in detail further. However, the arrangement 201 differs from the arrangements 1, 101, in several respects discussed below.

In the arrangement of FIG. 3, it is recognised that the pump 234 need not be a peristaltic pump. The pump 234 may be any suitable form of pump capable of pumping reactant fluid from the reactant fluid reservoir 240 through fluid lines 260, 261 via fluid couplings 244, 247 to valve 232 and then to reaction chamber 249 via conduit 248. Other particularly preferred types of pump include electro-osmotic and piezo pumps.

Also shown in FIG. 3 is a magnet 227 and a metal plate 236 used as a detachable retention mechanism for maintaining the fuel cell power module 202 and the adaptor module 203 in contact with one another. The magnet and metal plate arrangement may also be used as a sensing mechanism to monitor secure engagement of the fuel cell power module 202 and the adaptor module 203, for example by the microcontroller 223.

In a general aspect, the motor and pump 234 exemplify a motive unit of a flow control mechanism configured to provide motive power to a flow circuit of a reactor module 204 when the reactor module is coupled to the adaptor module 203. The flow circuit may be considered to include the reservoir 240, the valve 232, the conduit 248, the reaction chamber 249 and the fuel outlet port 254.

Figure 4:
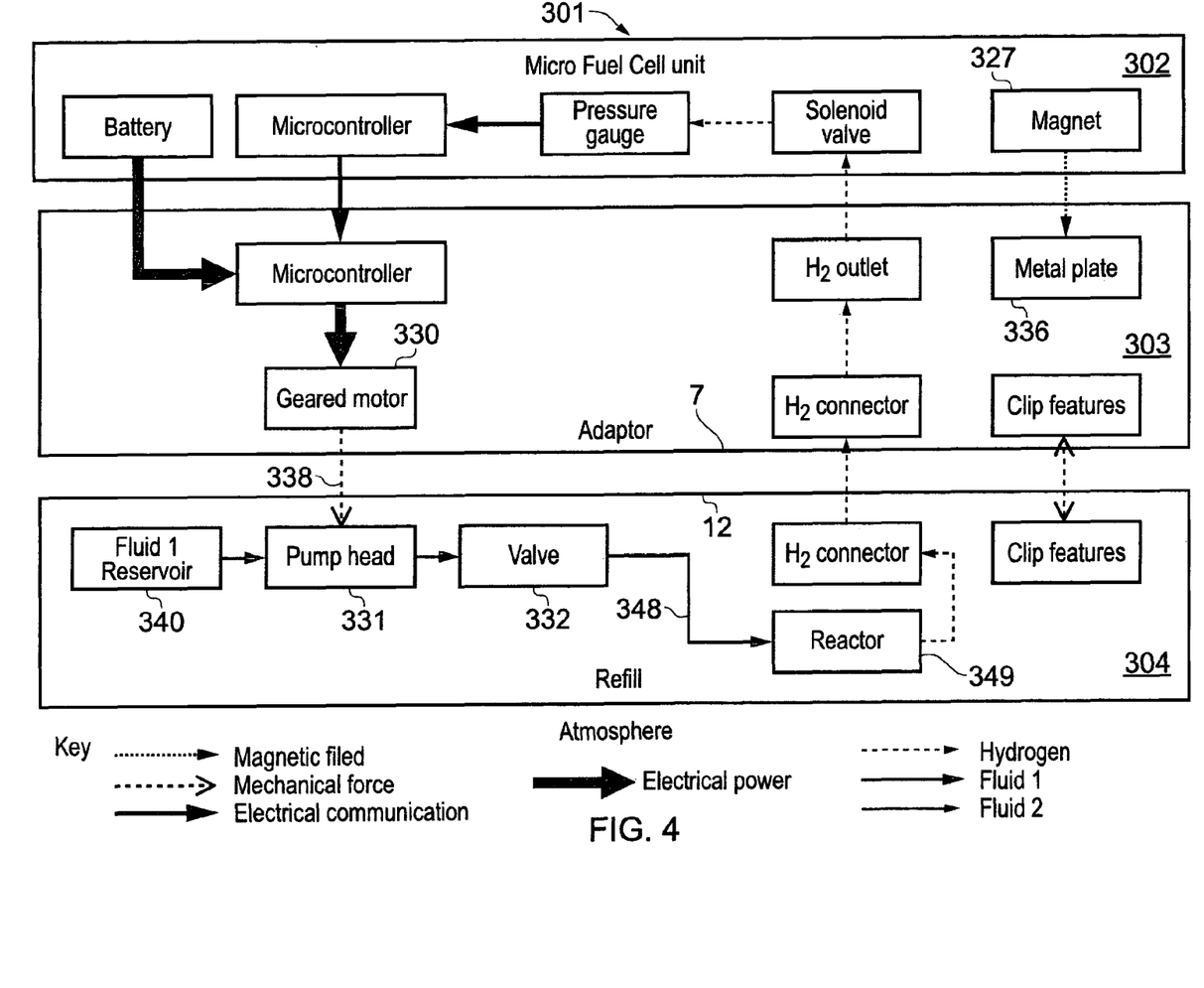
FIG. 4 is a schematic diagram of a modular fuel cell power source, adaptor and reactor assembly deploying a motor drive unit in the adaptor and a pump head in the reactor module.

FIG. 4 shows another modular arrangement of a fuel cell power supply 301 comprising a fuel cell power module 302, an adaptor module 303 and a reactor module 304. Most features of this arrangement are the same or similar to the features of the fuel cell power supplies of FIGS. 1 to 3 and need not be described in detail further. However, the arrangement 301 differs from the arrangements 1, 101, 201 in several respects discussed below.

In the arrangement of FIG. 4, it is recognised that the pump need not be a peristaltic pump and the geared motor part 330 could be any suitable motor drive unit for any suitable pump head 331. The geared motor part 330 serves to drive the pump head 331 which pumps reactant fluid from the reservoir 340 through valve 332 to the reaction chamber 349.

In a general aspect, the motor part 330 and its drive output 338 exemplify a motive unit of a flow control mechanism configured to provide motive power to a flow circuit of a reactor module 304 when the reactor module is coupled to the adaptor module 303. The flow circuit may be considered to include the reservoir 340, the pump head 331, the valve 332, the conduit 348, the reaction chamber 349 and the fuel outlet port 354.

The arrangements of FIGS. 2 and 4 may offer an advantage over the arrangements of FIGS. 1 and 3 in that only one fluid coupling 154, 354 across the interface 7, 12 is required for transport of fluids, e.g. of hydrogen fuel, from the reactor module 104, 304 to the adaptor module 103, 303. The fluid couplings 44, 47 are not required.

Figure 5:
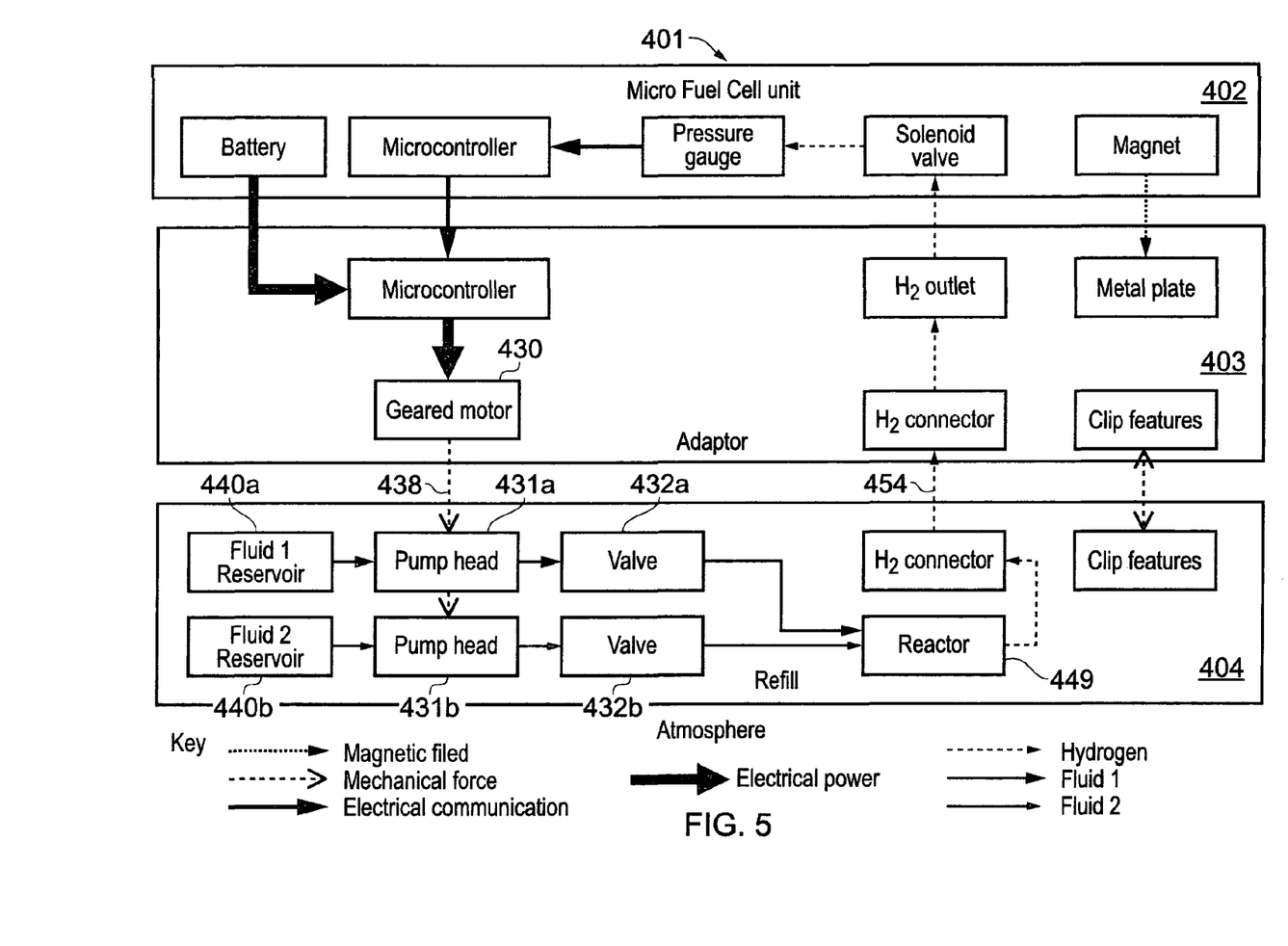
FIG. 5 is a schematic diagram of a modular fuel cell power source, adaptor and reactor assembly deploying a motor drive unit in the adaptor and dual pump heads in the reactor module.

FIG. 5 shows another modular arrangement of a fuel cell power supply 401 comprising a fuel cell power module 402, an adaptor module 403 and a reactor module 404. Most features of this arrangement are the same or similar to the features of the fuel cell power supply of FIG. 4 and need not be described in detail further. However, in the arrangement of FIG. 5, one geared motor part 430 is provided in the adaptor module 403 which is configured to drive multiple pump heads 431a, 431b in the reactor module 404 with the drive shaft indicated schematically at 438. The geared motor part 430 serves to drive the pump head 431a which pumps reactant fluid from a first reservoir 440a through a valve 432a to the reaction chamber 449. The geared motor part 430 also serves to drive the pump head 431b which pumps reactant fluid from a second reservoir 440b through a valve 432b to the reaction chamber 449.

This arrangement can be used, for example, when first and second reactants are held in separate reservoirs 440a, 440b and mixed and reacted in a separate reaction chamber 449, rather than in the arrangements of FIGS. 1 to 4 in which a first reactant is added to the second reactant already present in the reaction chamber. Alternatively, the arrangement of FIG. 5 can be used where three reactants or two reactants and a catalyst material are required, which can be respectively held in the two fluid reservoirs 440a, 440b and the reaction chamber 449 for mixing.

The arrangement of FIG. 5 can be further adapted to include more than two reservoirs 440a, 440b each having a separate pump head 431a, 431b and a separate valve 432a, 432b.

In a general aspect, the motor 430 and its drive output 438 exemplify a motive unit of a flow control mechanism configured to provide motive power to two flow circuits of a reactor module 404 when the reactor module is coupled to the adaptor module 403. The flow circuits may be considered to include the reservoirs 440a, 440b, the pump heads 431a, 431b, the valves 432a, 432b, conduits 448a, 448b, reactor 449 and fuel outlet port 454.

Figure 6:
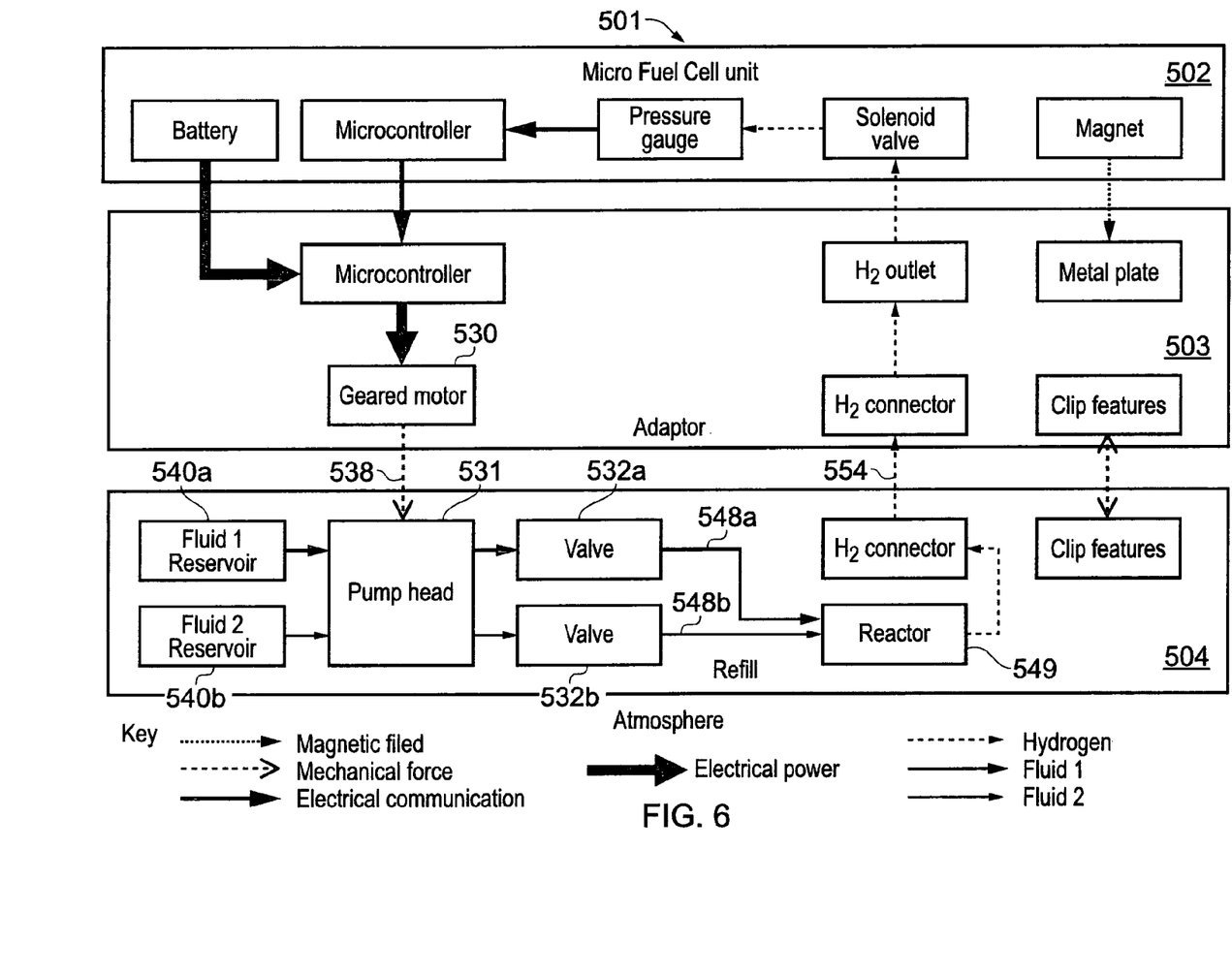
FIG. 6 is a schematic diagram of a modular fuel cell power source, adaptor and reactor assembly deploying a motor drive unit in the adaptor and split pump head in the reactor module.

FIG. 6 shows a variation on the modular arrangement of FIG. 5 in which a geared motor part 530 serves to drive a dual fluid split pump head 531 which has two flow paths and pumps reactant fluid from a first reservoir 540a through valve 532a to the reaction chamber 549 and pumps reactant fluid from a second reservoir 540b through valve 532b to the reaction chamber 549.

In a general aspect, the motor 530 and its drive output 538 exemplify a motive unit of a flow control mechanism configured to provide motive power to two flow circuits of a reactor module 504 when the reactor module is coupled to the adaptor module 503. The flow circuits may be considered to include the reservoirs 540a, 540b, the dual fluid pump head 531, the valves 532a, 532b, conduits 548a, 548b, reactor 549 and fuel outlet port 554.

Figure 7:
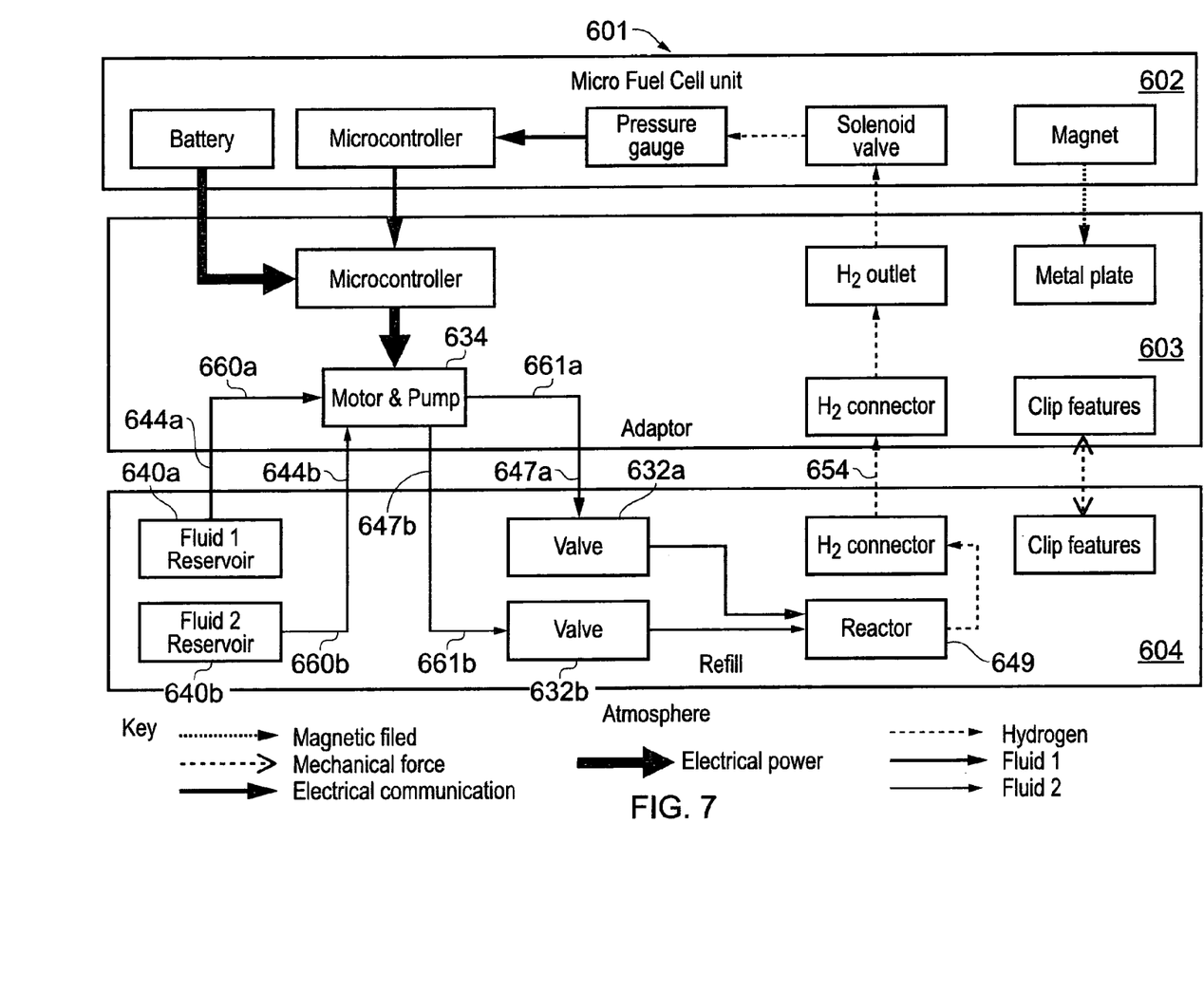
FIG. 7 is a schematic diagram of a modular fuel cell power source, adaptor and reactor assembly deploying a dual fluid pump unit in the adaptor.

FIG. 7 shows a variation on the modular arrangement of FIG. 3 in which a dual fluid, dual path pump 634 is operable to pump a first reactant fluid from a first reservoir 640a through fluid lines 660a, 661a via fluid couplings 644a, 647a to valve 632a and then to reaction chamber 649, and is also operable to pump a second reactant fluid from a second reservoir 640b through fluid lines 660b, 661b via fluid couplings 644b, 647b to valve 632b and then to reaction chamber 649.

In a general aspect, the pump 634 exemplifies a motive unit of a flow control mechanism configured to provide motive power to two flow circuits of a reactor module 604 when the reactor module is coupled to the adaptor module 603. The flow circuits may be considered to include the reservoirs 640a, 640b, the fluid lines 660a, 660b, 661a, 661b, the valves 632a, 632b, conduits 648a, 648b, the reactor 649 and the fuel outlet port 654.

Figure 8:
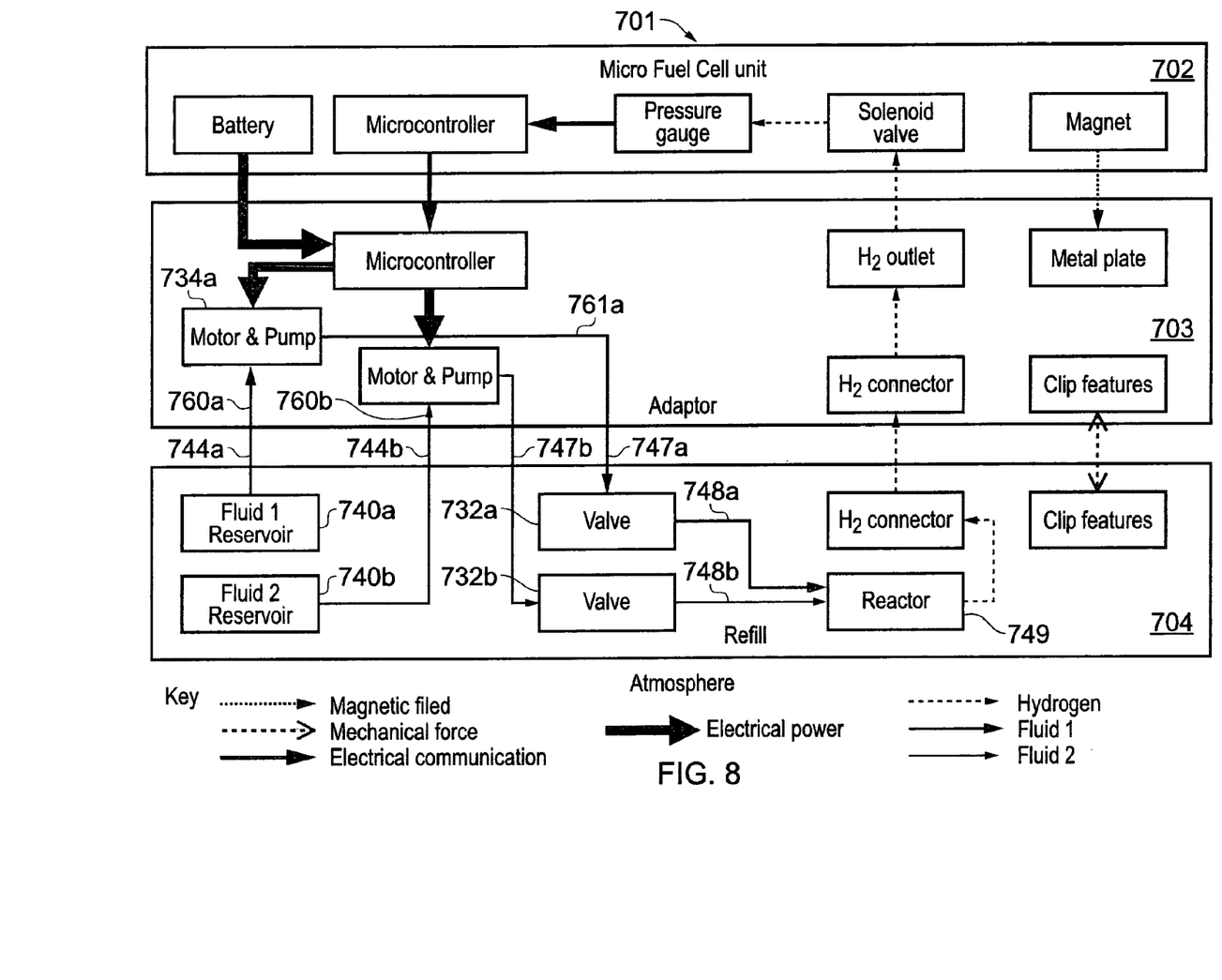
FIG. 8 is a schematic diagram of a modular fuel cell power source, adaptor and reactor assembly deploying dual pump units in the adaptor.

FIG. 8 shows a variation on the modular arrangement of FIG. 7 in which the dual fluid, dual path pump 634 is replaced by two separate pumps 734a, 734b. The first pump 734a is configured to pump a first reactant fluid from a first reservoir 740a through fluid lines 760a, 761a via fluid couplings 744a, 747a to valve 732a and then to reaction chamber 749, and is also operable to pump a second reactant fluid from a second reservoir 740b through fluid lines 760b, 761b via fluid couplings 744b, 747b to valve 732b and then to reaction chamber 749.

In a general aspect, the pump 734 exemplifies a motive unit of a flow control mechanism configured to provide motive power to two flow circuits of a reactor module 704 when the reactor module is coupled to the adaptor module 703. The flow circuits may be considered to include the reservoirs 740*a*, 740*b*, the fluid lines 760*a*, 760*b*, 761*a*, 761*b*, the valves 732*a*, 732*b*, conduits 748*a*, 748*b*, reactor 749 and fuel outlet port 754.

Figure 9:
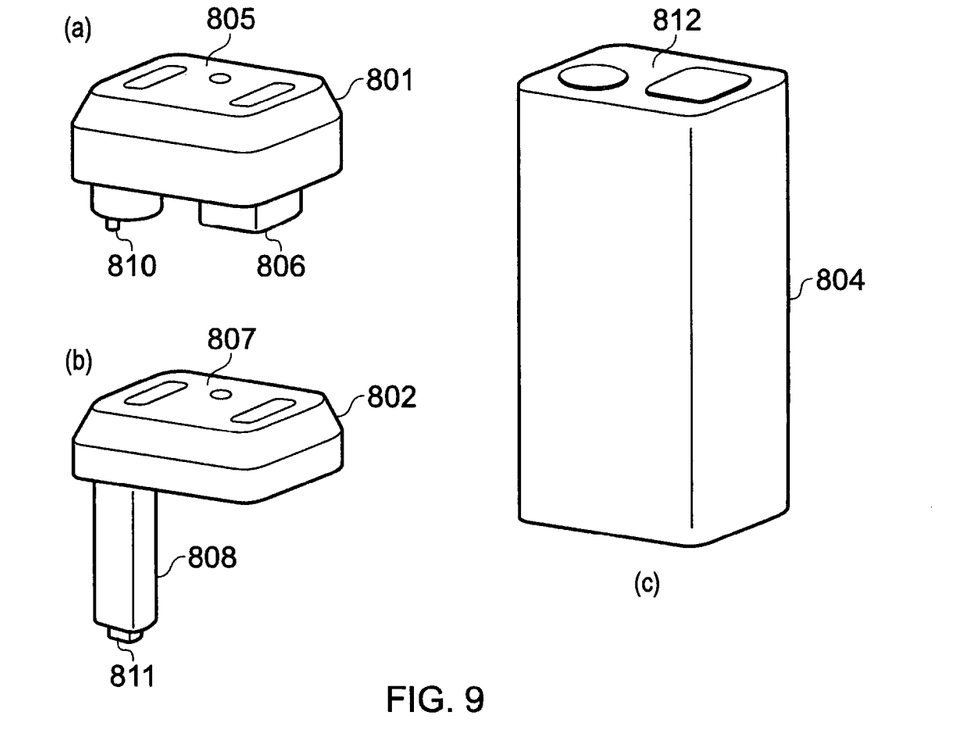
FIG. 9 is a schematic perspective view of adaptors and a reactor assembly.

FIG. 9 shows two exemplary physical layouts of adaptor modules 801, 802 (FIGS. 9*a*, 9*b*) for a fuel cell power supply for use with a reactor module 804 (FIG. 9*c*). FIG. 9*a* shows an adaptor module 801 suitable for engagement with the reactor module 804. The top portion 805 defines the first connection interface between the adaptor module and a fuel cell power module 2 (not shown in FIG. 9). The bottom portion 806 defines the second connection interface between the adaptor module 801 and the reactor module 804. The motive unit comprising the pump motor (e.g. motor 130 and drive shaft 138) is disposed in a lower protruding portion 810 for engagement with the reactor module 804 at the reactor module interface 812.

FIG. 9*b* shows an alternative adaptor module 802 suitable for engagement with the reactor module 804. The top portion 807 defines the first connection interface between the adaptor module and a fuel cell power module 2. The bottom portion 808 defines the second connection interface between the adaptor module 802 and the reactor module 804. The motive unit comprising the pump motor (e.g. motor 130 and drive shaft 138) is disposed in an extended lower protruding portion 811 for engagement with and into the reactor module 804.

Other arrangements are possible, beyond those described in connection with FIGS. 1 to 9.

For example, where a reactor module includes a mechanically spring-loaded chamber urging fluid from a fluid reservoir 40 into a reaction chamber 49 with sufficient pressure that a separate pump (e.g. an electrically operated pump 34) is not required, the adaptor module 3 may have the pump 34 replaced with an electrically operated flow control valve to control the flow from the fluid reservoir 40 to the reaction chamber 49 via the fluid couplings 44, 47. In this instance, the motive unit of the adaptor module may be exemplified by a flow control valve. The flow control valve may comprise a switching valve (e.g. a simple electromechanical on-off valve) and/or a flow regulator for fine control of flow rate, such as a variable orifice flow controller.

Although some of the embodiments described above preferably propose the use of a fluid reactant in at least one reservoir 40 and a solid (e.g. powdered) reactant in a reaction chamber 49, to which the fluid reactant is pumped, the reaction chamber can be realised with two liquid reactants delivered and mixed into or at a reaction chamber. The motive unit could also be configured to drive a solid (e.g. powdered/particulate) reactant provided that the flow control mechanism is configured to drive such solid particulates through the pump. The fluid reactant in the fluid reservoir 40 could be a chemical solution which reacts in the presence only of a catalyst which is provided in the reaction chamber 49.

Preferably, the adaptor module is manufactured from durable components capable of being used for a substantial number of reactor module changes, e.g. with a component life-span similar to that of the fuel cell power module. The reactor module may be manufactured from low cost, less durable components for one-time use (e.g. fully disposable) or may have a lifespan suitable for limited-life or extended-life refilling operations. Ideally, the reactor module has no, or few, durable components and limited or no on-board intelligence, e.g. in the form of electronic control components.

The adaptor module can provide the control functions and control intelligence customised to a specific type of reactor module and to the particular fuel cell power module so that different types of reactor module can be successfully used with different types of fuel cell power modules having different physical layouts (e.g. form factor) and different fuel flow control requirements. The control functions for controlling delivery of fuel from a reactor module to a fuel cell power source using a motive unit within the adaptor can be performed by a microcontroller in the adaptor (e.g. controller 35), or by a microcontroller in the power module 2 (e.g. controller 23), or the functions can be distributed between the two controllers in any convenient or strategic manner. The control functions can be implemented using any appropriate application-specific hardware, and/or firmware, or using software loaded into a suitable generic data processing device, or any combination of the above. The expression 'microcontroller' is intended to encompass all of the above. A computer program for configuring such a microcontroller may be provided on any computer-readable medium. The computer-readable medium may be a physical medium such as optical or magnetic medium or a solid state memory device. The computer-readable medium may comprise a transient signal on any suitable data communication channel.

Any suitable reactor module may be used for generating an appropriate fuel such as hydrogen with any required reactants. One example could be a reaction chamber 49 pre-charged with sodium borohydride which is reacted with water from the reactant fluid reservoir 40.

The adaptor module may provide additional functionality if required. For example, it may be possible to use water generated by the fuel cell power module during the electrochemical reaction of hydrogen and oxygen at the fuel cell membranes to provide a further supply of reactant to the reactor module. In this case, the adaptor module may provide a further flow conduit from the fuel cell power module to the reactor module for transfer of water thereto.

The motive unit of the adaptor module may also be configured to provide an agitation function (e.g. stirring) to the reactor module if required.

Figure 10:
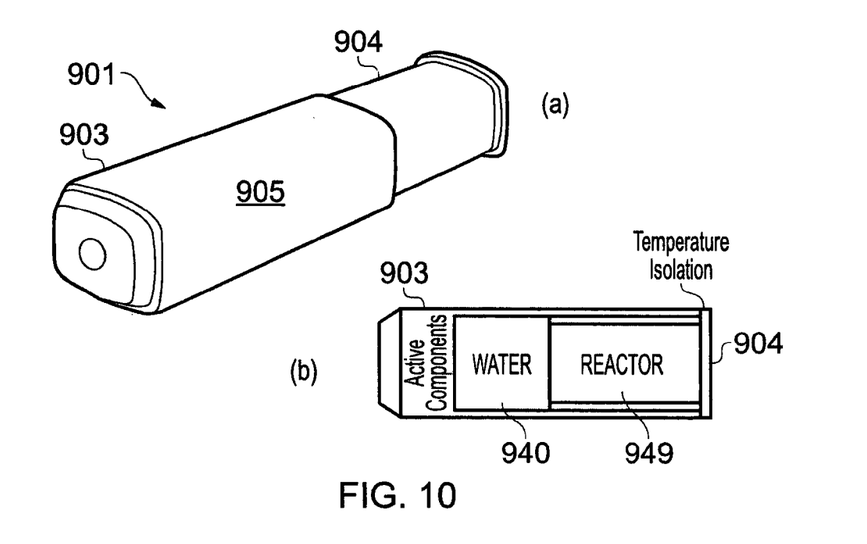
FIG. 10 shows a schematic perspective and cross-sectional view of an adaptor and reactor assembly.

Other physical arrangements for the adaptor module 3 and the reactor module 4 are envisaged. For example, with reference to FIG. 10, a fuel cell power supply apparatus 901 may include an adaptor module 903 in which the housing 905 of the adaptor module 903 forms a cavity, e.g. of generally cylindrical shape, into which a correspondingly-shaped reactor module 904 is fully, or almost fully, received is illustrated in FIG. 10*b*. The reactor module 904 contains a fluid reservoir 940 and reaction chamber 949 as previously described in connection with FIGS. 1 to 9. The reactor module 904 may be slid into the adaptor module 903 housing 905 in the direction indicated by the arrows in FIG. 9*a*, thereby preparing the adaptor module/reactor module combination ready for use and for coupling to a fuel cell power module 2 (not shown in FIG. 10).

In a more general aspect, the adaptor module 3 and the reactor module 4 may be formed such that they can be plugged together into a single overall housing to form a convenient and secure unit for portability. The single overall housing may be an independent housing separate from the respective housings of the adaptor module and the reactor module, or it may be a part of the housing of one of the adaptor module 3 or reactor module 4 into which the other module is wholly or partly received, such as exemplified by FIG. 10. In such a case, the second communication interface 7 of the adaptor module 3 or the corresponding interface 12 of the reactor module 4 can be on a recessed part of the respective housing, as seen in FIG. 10. The adaptor module 3 may define a cavity into which the reactor module 4 is received. This cavity could be closable with a door, clasp or latching arrangement when the reactor module is plugged in or otherwise received into the cavity, thereby creating a secure unit for portability. Similarly, the reactor module 4 may define a cavity into which the adaptor module is received. In this case, however, the first communication interface 6 of the adaptor module 3 will need to remain exposed for connection to a fuel cell power module 2 when in use. The housing arrangements generally described above are also applicable to all of the other examples of FIGS. 2 to 8.

In another arrangement, the plugged-together unit 903, 904 exemplified by FIG. 10b could be receivable into a housing defined by the fuel cell power module 2, such that the first communication interface 6 of the adaptor module 3, 903 engages with a corresponding interface 11 of the fuel cell power module 2, within a recess defined by the fuel cell power module housing 14. Thus, the adaptor module 3 may define a cavity into which the reactor module 4 is received and the fuel cell power module 2 may define a cavity into which the plugged-together adaptor module and reactor module are received. This cavity could be closable with a door, clasp or latching arrangement when the reactor module and adaptor module are plugged in or otherwise received into the cavity, thereby creating a secure unit for portability.

In other arrangements, components of the adaptor module 3, 103, 203, 303, 403, 503, 603, 703 may be integrated into the fuel cell power module 2, 102, 202, 302, 402, 502, 602, 702. In such arrangements, the motive unit of a flow control mechanism (e.g. the peristaltic pump 34, the geared motor 130, the motor and pump 234, 634, 734a, 734b, or the motor 330, 430, 530) is housed within and integrated into the fuel cell power module and is configured to provide motive power to a flow circuit of a reactor module when the reactor module is coupled to the fuel cell power source. In such arrangements, it will be recognised that the first communication interface 6 and corresponding interface 11 can be dispensed with and the flow paths such as fluid fuel line 30 and associated components such as the shut off valve 31 and pressure relief valve can be integrated into the fuel cell power module. The motive unit of the fuel cell power module effectively provides control of delivery of fuel from the reactor module to the fuel cell power module. The motive unit is preferably a mechanical or electromechanical unit.

Other embodiments are intentionally within the scope of the accompanying claims.

The invention claimed is:

1. An adaptor for a fuel cell power source comprising:
a housing;
a first connection interface in the housing for detachably coupling the adaptor to a fuel cell power module fuel inlet port;
a second connection interface in the housing for detachably coupling the adaptor to a reactor module fuel outlet port;
a fluid line extending between the first connection interface and the second connection interface;
a motive unit of a flow control mechanism configured to provide motive power to a flow circuit of a reactor module when the reactor module is coupled to the adaptor, wherein the motive unit comprises one of:
(a) a motor and pump, wherein the second connection interface further comprises a first reactant port and a second reactant port and the pump is disposed in a fluid line extending between the first reactant port and the second reactant port;
(b) a pump motor having a drive output disposed on the second connection interface for coupling to a pump head in the reactor module;
(c) a flow control valve, wherein the second connection interface further comprises a first reactant port and a second reactant port and the switching valve is disposed in a fluid line extending between the first reactant port and the second reactant port.

2. The adaptor of claim 1 in which:
the motive unit comprises a motor and pump, and
the second connection interface further comprises a first reactant port and a second reactant port, the pump being disposed in a fluid line extending between the first reactant port and the second reactant port.

3. The adaptor of claim 2 in which, when the motive unit comprises the motor and pump, the motor and pump comprises a peristaltic pump.

4. The adaptor of claim 1 in which the motive unit comprises a pump motor having a drive output disposed on the second connection interface for coupling to a pump head in the reactor module.

5. The adaptor of claim 4 in which, when the motive unit comprises the pump motor, the drive output comprises a roller configured to cooperate with a peristaltic pump head in a reactor module when the reactor module is coupled to the second connection interface.

6. The adaptor of claim 1 in which the first connection interface further includes an electrical connection interface for receiving control signals and/or electrical power from a fuel cell power module.

7. The adaptor of claim 6 further including an electronic controller coupled to the electrical connection interface for receiving control signals from the fuel cell power module.

8. The adaptor of claim 1 in which the first connection interface further includes a mechanical actuator coupled to a valve, the mechanical actuator being operable by a fuel cell power module when coupled to the first connection interface.

9. The adaptor of claim 1 in which the first connection interface further includes a mechanical actuator coupled to a valve, the mechanical actuator being operable by a fuel cell power module when coupled to the first connection interface.

10. The adaptor of claim 1 in which the second connection interface comprises a mechanical actuator for operating a closure valve or seal of the reactor module.

11. The adaptor of claim 7 further including a controller configured to control the motive unit.

12. The adaptor of claim 1 in which:
the motive unit comprises a flow control valve, and
the second connection interface further comprises a first reactant port and a second reactant port, the switching valve being disposed in a fluid line extending between the first reactant port and the second reactant port.

13. A modular reactor assembly comprising an adaptor according to any preceding claim and a reactor module, the reactor module having a connection interface configured to engage and cooperate with the second connection interface of the adaptor.

14. The modular reactor assembly of claim 13 in which the reactor module comprises:
a reactant reservoir containing a first reactant,
a reaction chamber containing a second reactant; and
(a) when the motive unit comprises the pump motor having a drive output, the reactor module further comprises a flow circuit comprising a flow path extending between the reactant reservoir and the reaction chamber and a flow control element in the flow path for controlling flow of first reactant to the reaction chamber, the flow control element being driveable by the motive unit of the adaptor when the reactor module is coupled to the second connection interface of the adaptor;

(b) when the motive unit comprises the motor and pump or the flow control valve, the reactor module further comprises a flow circuit comprising a first flow path extending from the reactant reservoir to the reactor module connection interface and a second flow path extending from the reactor module connection interface to the reaction chamber; and in which the first reactant port and the second reactant port of the adaptor are configured to respectively engage with the first flow path and the second flow path of the reactor connection interface, the motive unit comprising a flow control element in the fluid line extending between the first reactant port and the second reactant port for controlling flow of first reactant to the reaction chamber via the fluid line of the adaptor when the reactor module is coupled to the second connection interface of the adaptor.

15. The modular reactor assembly of claim 13 in which the adaptor defines a cavity into which the reactor module is received.

16. The modular reactor assembly of claim 15 in which the cavity is closable when the reactor module is received into the cavity.

17. The modular reactor assembly of claim 13 in which the reactor module defines a cavity into which the adaptor module is received.

18. A computer-readable medium comprising a physical medium selected from the group consisting of an optical medium, a magnetic medium, or a solid-state memory device, the computer-readable medium configured for loading onto a microcontroller in the adaptor of claim 1 for a fuel cell power source to configure the adaptor to control delivery of fuel from a reactor module to a fuel cell power source, using a motive unit within the adaptor.

19. A fuel cell power source comprising:
a housing;
a connection interface in the housing for detachably coupling the fuel cell power source to a reactor module fuel outlet port;
a motive unit of a flow control mechanism configured to provide motive power to a flow circuit of a reactor module when the reactor module is coupled to the fuel cell power source;
wherein the motive unit comprises one of:
(a) a motor and pump, and the connection interface further comprises a first reactant port and a second reactant port, the pump being disposed in a fluid line extending between the first reactant port and the second reactant port;
(b) a pump motor having a drive output disposed on the connection interface for coupling to a pump head in the reactor module; and
(c) a flow control valve, and the connection interface further comprises a first reactant port and a second reactant port, the flow control valve being disposed in a fluid line extending between the first reactant port and the second reactant port.

20. The fuel cell power source of claim 19 in which:
the motive unit comprises a motor and pump, and the connection interface further comprises a first reactant port and a second reactant port, the pump being disposed in a fluid line extending between the first reactant port and the second reactant port.

21. The fuel cell power source of claim 20 in which the motor and pump comprises a peristaltic pump.

22. The fuel cell power source of claim 19 in which the motive unit comprises a pump motor having a drive output disposed on the connection interface for coupling to a pump head in the reactor module.

23. The fuel cell power source of claim 22 in which the drive output comprises a roller configured to cooperate with a peristaltic pump head in a reactor module when the reactor module is coupled to the connection interface.

24. The fuel cell power source of claim 19 in which the connection interface comprises a mechanical actuator for operating a closure valve or seal of the reactor module.

25. The fuel cell power source of claim 19 in which:
the motive unit comprises a flow control valve, and
the second connection interface further comprises a first reactant port and a second reactant port, the switching valve being disposed in a fluid line extending between the first reactant port and the second reactant port.

26. The fuel cell power source of claim 19 further including a cavity in the housing into which a reactor module is receivable.

27. A computer-readable medium comprising a physical medium selected from the group consisting of an optical medium, a magnetic medium, or a solid-state memory device, the computer-readable medium configured for loading onto a microcontroller in the fuel cell power source of claim 19 to configure the fuel cell power source to control delivery of fuel from a reactor module to the fuel cell power source using a motive unit within the fuel cell power source.

28. A method of operating a fuel cell power source comprising:
a) providing an adaptor having:
a housing;
a first connection interface in the housing for detachably coupling the adaptor to a fuel cell power module fuel inlet port;
a second connection interface in the housing for detachably coupling the adaptor to a reactor module fuel outlet port;
a fluid line extending between the first connection interface and the second connection interface;
a motive unit of a flow control mechanism configured to provide motive power to a flow circuit of a reactor module when the reactor module is coupled to the adaptor;
b) coupling the first connection interface to a fuel cell power module;
c) connecting the second connection interface to a reactor module; and
d) controlling delivery of fuel from the reactor module to the fuel cell power module via the adaptor;
wherein the motive unit comprises one of:
(i) a motor and pump, and the connection interface further comprises a first reactant port and a second reactant port, the pump being disposed in a fluid line extending between the first reactant port and the second reactant port;
(ii) a pump motor having a drive output disposed on the connection interface for coupling to a pump head in the reactor module; and
(iii) a flow control valve, and the connection interface further comprises a first reactant port and a second reactant port, the flow control valve being disposed in a fluid line extending between the first reactant port and the second reactant port.

29. The method of claim 28 further including the step of controlling delivery of fuel by an electronic controller in the adaptor.

30. The method of claim 29 whereby a computer software code instructs a microcontroller to control the delivery of fuel.

31. The method of claim 28 whereby a computer software code instructs a microcontroller to control the delivery of fuel.

32. A method of operating a fuel cell power source comprising:
   a) providing a fuel cell power source having:
      a housing;
      a connection interface in the housing for detachably coupling the fuel cell power source to a reactor module fuel outlet port;
      a motive unit of a flow control mechanism configured to provide motive power to a flow circuit of a reactor module when the reactor module is coupled to the fuel cell power source;
   b) coupling the connection interface to a reactor module; and
   c) controlling delivery of fuel from the reactor module to the fuel cell power module using the motive unit in the fuel cell power source;
   wherein the motive unit comprises one of:
      (i) a motor and pump, and the connection interface further comprises a first reactant port and a second reactant port, the pump being disposed in a fluid line extending between the first reactant port and the second reactant port;
      (ii) a pump motor having a drive output disposed on the connection interface for coupling to a pump head in the reactor module; and
      (iii) a flow control valve, and the connection interface further comprises a first reactant port and a second reactant port, the flow control valve being disposed in a fluid line extending between the first reactant port and the second reactant port.

33. The method of claim 32 whereby a computer software code instructs a microcontroller to control the delivery of fuel.

* * * * *